United States Patent [19]

Nielsen, Jr.

[11] Patent Number: 4,471,982
[45] Date of Patent: Sep. 18, 1984

[54] TAMPER INDICATING COVER FOR A GAS METER

[76] Inventor: Anker J. Nielsen, Jr., 410 Bailey Rd., Holden, Mass. 01520

[21] Appl. No.: 360,169

[22] Filed: Mar. 22, 1982

[51] Int. Cl.³ .............................................. B65D 33/34
[52] U.S. Cl. ................................................ 292/307 B
[58] Field of Search ................................ 285/80, 150; 292/DIG. 38, 307; 411/910; 339/205–210, 91

[56] References Cited

U.S. PATENT DOCUMENTS

| | | | |
|---|---|---|---|
| 1.380,362 | 6/1921 | Cunningham | 411/458 |
| 3,876,821 | 4/1975 | Pringle | 411/529 X |
| 4,286,640 | 9/1981 | Knox et al. | 292/307 B |
| 4,372,593 | 2/1983 | Kesselman | 411/910 |

*Primary Examiner*—Richard E. Moore
*Attorney, Agent, or Firm*—Irving M. Kriegsman

[57] ABSTRACT

A tamper indicating cover for use on a nut securing a gas supply line pipe to a gas meter is disclosed. The cover is adapted to fit around the nut so that the nut cannot be accessed (for removal) and once it has been placed around the nut and snapped shut cannot be removed without being broken. In one embodiment of the invention the cover is made up of a pair of plastic "C" shaped mating cavity sections sized to fit around the top, sides and bottom of the nut, a hinge section which pivotally connects the lower end of each cavity section together and which is integrally formed with the two cavity sections and a metal clip which is adapted to be snap-locked into an internal slot formed in the upper end of one cavity section and then caused to snap-lock into a corresponding internal slot formed in the upper end of the other cavity section when the two upper ends are brought into engagement with each other. The edges of the lower end of each cavity section are bevelled at a 45° angle so that the two lower ends cannot be easily glued together if the hinge section is broken. A lateral groove is formed inside the upper end of one of the cavity sections defining a hidden line of weakness which breaks if the hinge section is broken and the cavity sections pivoted about their upper ends after the upper ends have been joined to each other by the metal clip. The outer surface of the hinge section is shaped so that it cannot be easily clipped or cut off. The metal clip includes a pair of spring biased locking elements which are directed inward when the clip is locked into the upper ends of the two cavity sections so that the clip cannot be subsequently disengaged from the upper ends by inwardly directed pressure. In another embodiment of the invention the cover is made up of a pair of plastic, "C" shaped, mating cavity sections, a first metal clip for snap-locking the two upper ends of the two cavity sections together and a second metal clip for snap-locking the two lower ends of the two cavity sections together.

17 Claims, 8 Drawing Figures

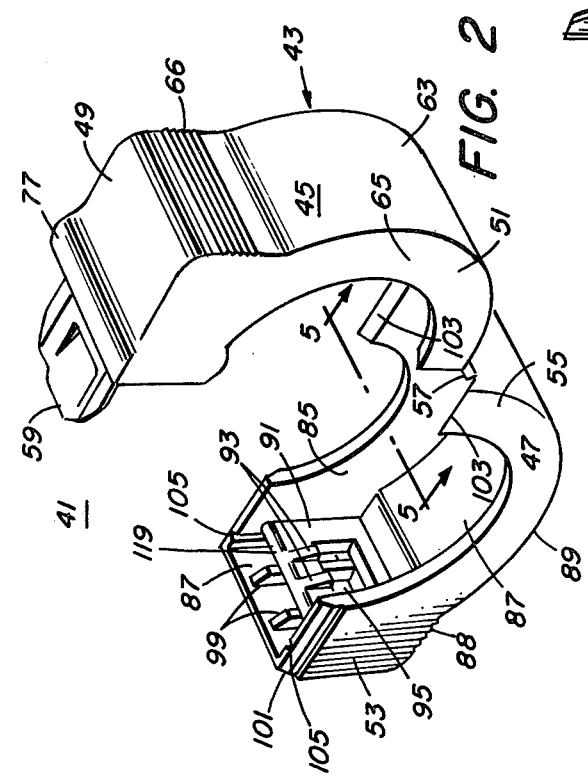
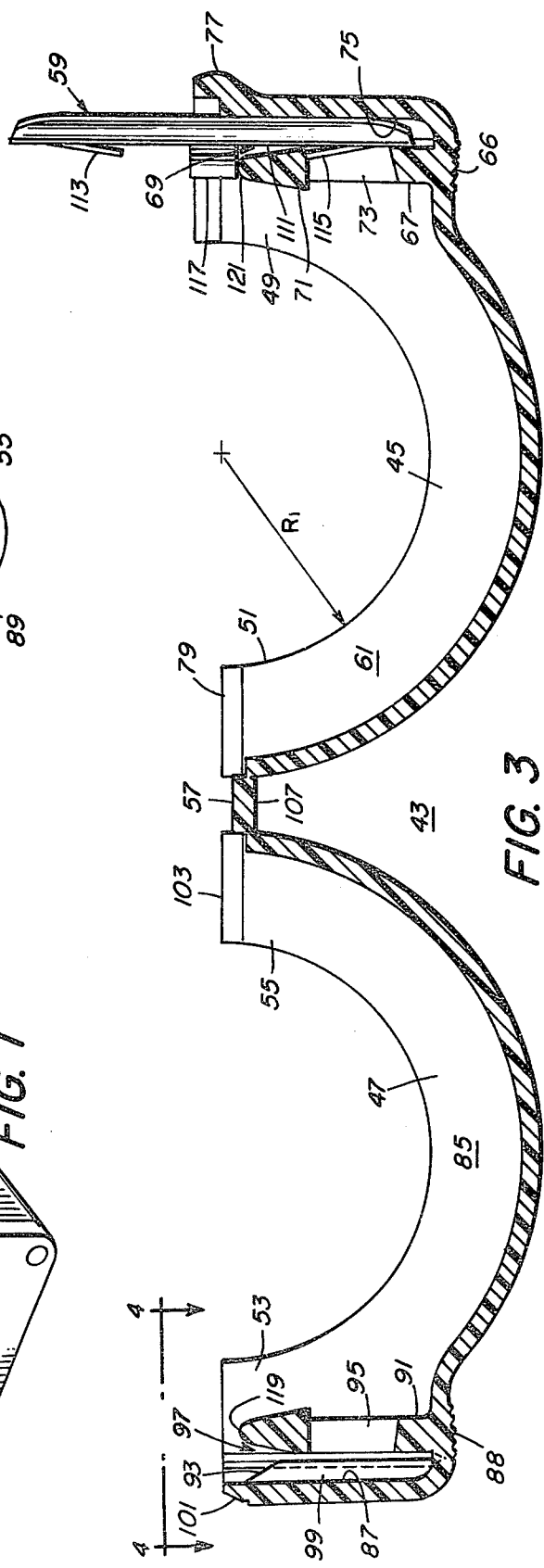

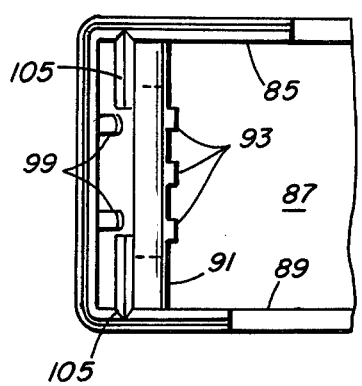
FIG. 4
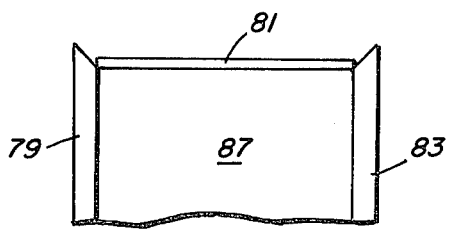
FIG. 5
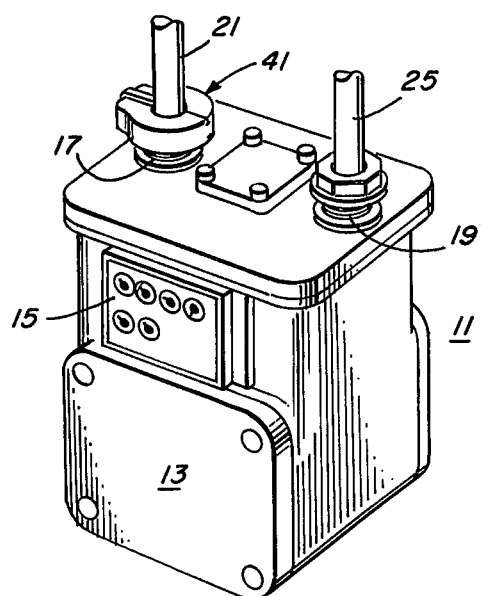
FIG. 7
FIG. 6
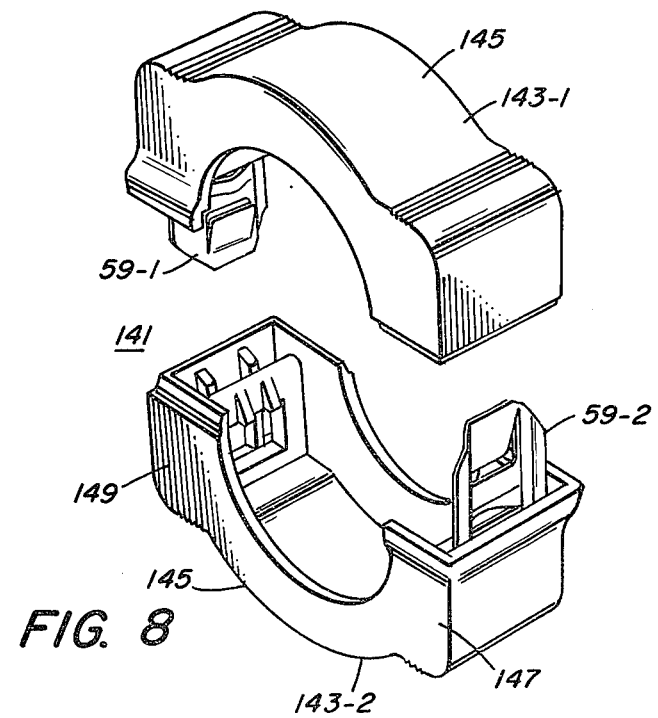
FIG. 8

TAMPER INDICATING COVER FOR A GAS METER

BACKGROUND OF THE INVENTION

The present invention relates generally to a tamper indicating cover for a gas meter and more particularly to a tamper indicating cover for a nut securing the output end of a gas supply line pipe to the inlet port of a gas meter used in monitoring the flow of gas to a home or other building.

Since the oil embargo of 1973 the cost of energy, i.e. gas, oil and electricity, has skyrocketed. Because of the higher prices and for various other reasons there has been a marked increase over the past several years in consumers stealing or attempting to steal the energy furnished by the utilities or private suppliers. One scheme for pilfering energy, which has become more than simply a nuisance, has involved by-passing the gas meter used to monitor the flow of gas into a home or other building. As is known, the amount of gas used by a consumer is monitored by a gas meter which is located at the user site. The gas meter includes an inlet port which is connected to the gas supply line pipe and an outlet port which is connected to another pipe which is connected to one or more gas operated appliances in the home or other building. Each pipe is usually secured to its respective port on the meter by means of a nut which is slidably mounted on the pipe and screwed into the respective port. As can be appreciated, by simply unscrewing the nut fastened onto each port, then disconnecting the two pipes from their respective ports and then connecting the two pipes directly to each other, such as by another pipe, the gas meter can be easily by-passed. One way to prevent by-passing the gas meter involves mounting a locking device over the nut securing the gas supply line pipe to the inlet port of the gas meter so that the gas supply line pipe cannot be disconnected from the inlet port of the gas meter. The problem with this approach is that locking devices which have been constructed for this purpose are relatively expensive and if a locking device were to be put on every gas meter the total cost for doing this would be prohibitive.

A more practical and less expensive approach involves placing a tamper indicating cover or seal over the nut which must be broken before the nut can be accessed. If a meter reader observes that a cover has been broken or removed he then places a locking device over the nut. Tamper indicating covers for this purpose have been proposed; however, for one reason or another they have not proven to be entirely satisfactory.

Accordingly, the need exists for a tamper indicating cover which is adapted to be mounted on the nut, which when mounted on the nut effectively blocks access to the nut, which once mounted on the nut cannot be removed without being broken and which after being broken cannot be restored to its original form without considerably working and without leaving some indication that is has been broken or tampered with.

SUMMARY OF THE INVENTION

It is an object of this invention to provide a tamper indicating cover for a gas meter.

It is another object of this invention to provide a tamper indicating cover for a nut securing the outlet end of a gas supply line pipe to an inlet port of gas meter.

It is still another object of this invention to provide a tamper indicating cover as described above which prevents access to the nut when mounted thereon and which after being mounted thereon and locked in place is virtually impossible to remove therefrom without being broken.

It is yet still another object of this invention to provide a tamper indicating cover as described above which is designed to break easily in an unexpected location if an attempt is made to pull or pry it apart after it has been closed.

It is a further object of this invention to provide a tamper indicating cover as described above which can be easily broken, if removal is desired.

It is still a further object of this invention to provide a tamper indicating cover as described above which is extremely difficult to reassemble once it has been broken without revealing that it has been broken.

It is another object of this invention to provide a tamper indicating cover as described above which is easy and economical to manufacture, which contains a minimum number of parts, which is easy to install and which can be made by mass production techniques.

A tamper indicating cover for a nut securing a gas supply line pipe to an inlet port of a gas meter constructed according to the teachings of the present invention comprises a pair of plastic, "C" shaped, mating cavity sections sized to loosely fit around the nut, one cavity section on each side of the nut, means fixedly connecting the lower ends of the two cavity sections together, and a clip adapted to be snap-locked inside each one of the upper ends of the two cavity sections for locking the two upper ends together, whereby the nut cannot be accessed when the tamper indicating cover is mounted thereon and wherein the tamper indicating cover once mounted thereon and snap locked shut cannot be removed from the nut without being broken.

In one embodiment of the invention the means fixedly connecting the lower ends of the two cavity sections together is a hinge section which is integrally formed with the two cavity sections and in another embodiment of the invention the means fixedly connecting the lower ends of the two cavity sections together is a second clip.

According to one feature of the invention of the clip, or clips, depending on the particular embodiment, are made of metal.

According to another feature of the invention the edges of the lower end of each cavity section are shaped so that the lower ends cannot be easily glued together if the cover is broken at the lower ends.

According to still another feature of the invention a hidden line of weakness is formed in one of the upper ends which breaks easily if the cover is broken at the lower ends of the two cavity sections and an attempt is made to pry the two cavity sections apart they are connected at their upper ends.

According to still another feature of the invention the clip is designed and mounted in the cover in a manner such that it cannot be dislodged therefrom by inwardly directed pressure.

According to a further feature of the invention the hinge section is shaped so that it cannot be easily cut off or snapped off.

The foregoing and other objects and advantages will appear from the description to follow. In the description, reference is made to the accompanying drawings which form a part thereof, and in which is shown, by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not be taken in a limiting sense, and the scope of the present invention is best defined by the appended claims.

BRIEF DESCRIPTION OF THE DRAWINGS

In the drawings wherein like reference numerals represent like parts:

FIG. 1 is a perspective view of a typical gas meter;

FIG. 2 is a perspective view of one embodiment of a tamper indicating cover constructed according to the principles of the present invention, in a partially "open" position;

FIG. 3 is a front section view of the tamper indicating cover shown in FIG. 2, with the two cavity sections being opened to an angle of about 180°.

FIG. 4 is a section view taken along lines 4—4 in FIG. 3 illustrating a portion of one of the upper ends of one of the cavity sections;

FIG. 5 is a section view taken along lines 5—5 in FIG. 2 illustrating a portion of one of the lower ends of one of the cavity sections;

FIG. 6 is a perspective view of the clip in the tamper indicating cover shown in FIG. 2.

FIG. 7 is a perspective view showing the tamper indicating cover of FIG. 2 mounted over the nut on the inlet port of the gas meter shwon in FIG. 1; and FIG. 8 is a partly exploded perspective view of another embodiment of a tamper indicating cover constructed according to the teachings of the present invention.

DETAILED DESCRIPTION OF PREFERRED EMBODIMENT

The present invention is directed to a tamper indicating cover for use on a nut securing a gas supply line pipe to the inlet port of a gas meter of the type found in a home or other building for monitoring the flow of gas into the home or other building.

Referring now to the drawings, there is illustrated in FIG. 1 a gas meter identified generally by reference numeral 11. Gas meter 11 includes a box shaped housing 13 having a face plate 15 containing a set of dials, an externally threaded gas inlet port 17 and an externally threaded gas outlet port 19. A gas supply line pipe 21 is connected to gas inlet port 17. and is secured thereto in the customary manner by means of a nut 23 which is slidably mounted on the gas supply line 21 and in threaded engagement with gas inlet port 17. An outlet pipe 25, adapted to be connected to one or more gas operated appliances (not shown) at its output end, is connected at its input end to gas outlet port 19 and is secured thereto in a conventional manner by a nut 27 which is slidably mounted on pipe 25 and in threaded engagement with gas outlet port 19.

Referring now to FIGS. 2 to 6 there is illustrated one embodiment of a tamper indicating cover constructed according to the teachings of the present invention and identified generally by reference numeral 41.

Although the invention will be described hereinafter for use in connection with covering nut 23, on the inlet side of gas meter 11, it is to be understood, of course, that the invention may also be used for covering nut 27, on the outlet side of gas meter 11, if desired, or for that matter, for covering a nut used in securing any pair of members together.

Tamper indicating cover 41 comprises a unitary structure 43.

Unitary structure 43 is made of a suitable plastic, such as polypropylene. The plastic preferably contains about 2% carbon black to prevent cracking from exposure to UV radiation from the sun. Structure 43 includeas a pair of generally "C" shaped, mating, cavity sections 45 and 47 which are sized and shaped so as to fit around the top, sides and bottom of nut 23. Cavity sections 45, includes an upper end 49 and a lower end 51, upper end 49 being somewhat enlarged and generally rectangular in cross section. Cavity section 47 includes an upper end 53 and a lower end 55, upper end 53 also being somewhat enlarged and generally rectangular in cross-section. Except for the differences as will hereinafter be noted, the two cavity sections 45 and 47 are generally similar in size and shape, one cavity section being essentially a mirror image of the other when connected as will hereinafter be described. Unitary structure 43 further includes a hinge section 57 which pivotally connects the lower ends 51 and 55 of the two cavity sections 45 and 47 together.

Tamper indicating cover 41 further includes a clip 59 which is adapted to be snap-locked into an internal slot located in each one of the outer ends 49 and 53 for snap locking the two upper ends 49 and 53 together when the two upper ends 49 and 53 are brought into mating engagement with each other.

Cavity section 45 is defined by a generally semiannular back wall 61, a generally semi-cylindrical side wall 63 and a generally semi-annular front wall 65. The outside surface of side wall 63 includes a plurality of finger gripping serrations 66 which are located near upper end 49. An internal wall or shelf 67 is integrally formed in upper end 49, the space between internal wall 67 and side wall 63 defining a clip receiving slot 69 for one end of clip 59. Internal wall 67 includes a plurality of longitudinally extending strengthening ribs 71 and has a centrally disposed rectangular shaped tongue receiving hole 73. A plurality of longitudinally extending guide ribs 75 for use in guiding and supporting clip 59 when it is inserted in clip receiving slot 69 are formed on the inside surface of side wall 63 inside the clip receiving slot 69. A peripheral flange 77 is formed on the end of upper end 49 which extends over the end of upper end 53 when the two upper end portions 49 and 53 are brought together. Edges 79, 81 and 83 at the lower end 51 of top wall 61, side wall 63 and front wall 65, respectively, are bevelled at a 45° angle so as to have a minimum surface area where they contact the corresponding edges of inner end 55 on cavity section 47.

Cavity section 47 includes a generally semi-annular back wall 85, a generally semi-cylindrical side wall 87, having finger gripping serrations 88, a generally semi-annular front wall 89, an internal wall 91 at the upper end portion 53 having strengthening ribs 93 and a centrally located rectangular shaped tongue receiving hole 95, a clip receiving slot 97 defined by the space between internal wall 91 and side wall 87, guide ribs 99 on side wall 87 for supporting clip 59, a bevelled end surface 101 at end portion 53 for fitting inside and mating with end portion 49 when the two upper ends are brought together, and 45° bevelled end surfaces 103 on back wall 85, side wall 87 and front wall 89 at lower end portion 55, the internal wall, the guide ribs the strengthening ribs, the tongue receiving hole and the clip receiving slot being identical in construction to the corresponding elements in upper end 49. Upper end 53 of cavity section 47 further includes a broken lateral "V" shaped groove 105 defining a hidden line of weakness which will break if hinge section 57 is broken or cut when the cavity sections 45 and 47 are locked together with clip 59 and an attempt is made to pry the two cavity sections apart by pivoting them about their connected upper ends 49 and 53.

Hinge 57 is a living hinge and is shaped so that its outer surface 107 is generally flat, making it thereby difficult to snip or cut off.

Unitary structure 43 may be made by any suitable process for making articles of plastic, such as by thermoplastic injection molding. The thickness of the front, side, back and internal walls in the cavity sections is preferably on the order of around 0.062 inches and the thickness of the hinge section 57 is preferably about 3/32 of an inch.

Clip 59 which is shown fully in FIG. 6, is an elongated generally rectangularly shaped sheet or strip of stainless steel sized so that it can be slidably inserted into the clip receiving slots and having a thickness preferably on the order of 0.02 inches. Clip 59 includes a raised rectangular central potion 111, a pair of rectangular spring biased tongue elements 113 and 115 formed on the raised central portion 111 which project own into holes 73 and 95 when the clip 59 is inserted into the clip receiving slots 69 and 97 and a raised stop 117, also formed on the central portion 111, which limits the inward movement of the clip when it is inserted in the clip receiving slots 69 and 97 by abutting against end surfaces 119 and 121 of inner walls 67 and 91, respectively.

Cavity sections 45 and 47 are sized so that the inside diameter of the cylindrical shape defined by side walls 63 and 87 when the two cavity sections are closed is larger than the outside cross-sectional diameter of nut 23. Consequently, cover 41 is free to rotate when it is mounted thereon and closed and if rotated will not produce corresponding rotational movement (turning) of nut 23. The inside diameter of the annular ring defined by back walls 61 and 85 (i.e. twice radius R1) is greater than the outside diameter of pipe 21 and less than the outside diameter of the top of nut 23. Consequently, cover 41 cannot be slid down off nut 23 after it is mounted thereon and closed. The inside diameter of the annular ring defined by front walls 65 and 89 is greater than the outside diameter of inlet port 17 and less than the outside diameter at the bottom of nut 23. As a result, cover 41 cannot be raised off nut 23 once mounted thereon and closed.

In assemblying cover 41, clip 59 is inserted into one of the clip receiving slots, such as slot 69 in cavity section 45 (as shown in FIG. 2) and pushed inward until stop 117 abuts against the front edge 119 of inner wall 67. At this point tongue 113 extends into hole 73, locking thereby the clip 59 into upper end portion 49. Cover 41 is then ready to be mounted on nut 23.

After cover 41 is placed around nut 23 with one cavity section on each side thereof, the two upper ends 49 and 53 brought together so that clip 59 snap locks into the clip receiving slot 97 in the upper end 53.

Cover 41 mounted on nut 23, as such, is shown in FIG. 7.

Referring now to FIG. 8, there is illustrated another embodiment of a cover constructed according to the teachings of the present invention and identified generally by reference numeral 141.

Cover 141 includes a pair of plastic "C" shaped mating cavity sections which are identical and are labelled 143-1 and 143-2 respectively, and a pair of metal clips 59 which are labelled 59-1 and 59-2 respectively. Each one of the cavity sections includes a central or intermediate portion 145 which is identical to the corresponding central portions of cavity sections 45 and 47, a female end section 147 identical in construction to upper end section 49 of cavity section and a male end section 149 identical in construction to end section 53 of cavity section 47. As can be appreciated, each one of the cavity sections 141 is equivalent to cavity section 45 with end 51 replaced by end 53 (or cavity section 47 with end 55 replaced by end 49).

In using cover 141, the two cavity sections are arranged so that the male end 149 of cavity section 143-1 is positioned to mate with the female end 147 of cavity section 143-2 and the female end 147 of cavity section 143-1 is positioned to mate with the male end 149 of each one of the mating ends as shown in FIG. 8. After the two cavity sections 143-1 and 143-2 are positioned around the nut each pair of mating ends is snap-locked shut at each end through its respective clip 59.

It is clear, that the present invention is well adapted to carry out the objects and attain the ends and advantages mentioned above as well as those inherent therein. While presently preferred embodiments of the invention have been described in this disclosure, numerous changes can be made which, with this disclosure, will readily suggest themselves to those skilled in the art and which are encompassed within the claims hereof.

What is claimed is:

1. A tamper indicating cover for a nut securing one end of a length of pipe to a port of a gas meter, said tamper indicating cover comprising:
   a. a pair of plastic, unitary structure "C" shaped, mating cavity sections sized and shaped so as to loosely fit around said nut, with one cavity section disposed on each side thereof, each cavity section including an upper end and a lower end,
   b. means fixedly connecting the lower end of each cavity section together, and
   c. a first clip snap-locked into the upper end of each cavity section for locking the two upper ends together, whereby said nut cannot be accessed when said tamper indicating cover once mounted on said nut and snap locked shut cannot be removed from said nut without being broken.

2. The tamper indicating cover of claim 1 and wherein each cavity section comprises a structure having a back wall, a front wall, and a side wall and wherein each upper end of each cavity section further includes an integrally formed internal wall spaced inward from and generally parallel with said side wall, the space between said internal wall and said side all at each upper end defining a clip receiving slot for said first clip.

3. A tamper indicating cover for a nut securing one end of a length of pipe to a port of a gas meter, said tamper indicating cover comprising:
   a. a pair of plastic, unitary structure "C" shaped, mating cavity sections sized and shaped so as to loosely fit around said nut, with one cavity section disposed on each side thereof, each cavity section including an upper end and a lower end and comprising a structure having a back wall, a front wall, and a side wall and wherein each upper end of each cavity section further includes an integrally formed internal wall spaced inward from and generally parallel with said side wall, the space between said internal wall and said side wall at each upper end defining a clip receiving slot for said first clip, b. means fixedly connecting the lower end of each cavity section together, and c. a first clip snap-locked into the upper end of each cavity section for locking the two upper ends together, said first clip comprising an elongated generally rectangular shaped strip having a pair of spring biased tongue elements, one near each end for snap locking said metal clip into each clip receiving slot and a stop at the midposition for limiting inward movement of said clip into each clip receiving slot and wherein each internal wall in each cavity section includes an opening for receiving one of said tongues of said clip when said clip is inserted fully into its respective clip receiving slot.

4. The tamper indicating cover of claim 3 and wherein said clip is made of metal.

5. The tamper indicating cover of claim 4 and wherein said means fixedly connecting the lower end of one cavity section to the lower end of the other cavity section is a hinge.

6. The tamper indicating cover of claim 5 and wherein said hinge is a living hinge.

7. The tamper indicating cover of claim 6 and wherein said hinge is integrally formed with said two cavity sections.

8. The tamper indicating cover of claim 4 and wherein said means fixedly connecting the lower end of one cavity section to the lower end of the other cavity section comprises a second metal clip adapted to be snap-locked into each one of said lower ends.

9. The tamper indicating cover of claim 5 and wherein said hinge includes a generally flat outer surface.

10. The tamper indicating cover of claim 5 and wherein the ends of the cavity sections connected by said hinge are bevelled so as to provide a minimum surface area at their point of contact with each other.

11. The tamper indicating cover of claim 4 and wherein the upper end of one cavity section includes a peripheral flange which overlaps the upper end of the other cavity section to which it is connected.

12. The tamper indicating cover of claim 4 and wherein one end of one cavity section includes an internal lateral groove defining a line of weakness.

13. The tamper indicating cover of claim 4 and wherein said front wall and said back wall of each cavity section are semi-annularly shaped and the side wall of each cavity is semicylindrically shaped.

14. The tamper indicating cover of claim 4 and wherein said metal clip is made of stainless steel and wherein said cavity sections are made of polypropylene.

15. The tamper indicating cover of claim 4 and wherein said inside surface of each side wall of each cavity section at said upper end portion includes at least one longitudinally extending guide rib for use in guiding and supporting said metal clip into said clip receiving slot at said upper end portion.

16. The tamper indicating cover of claim 12 and wherein said length of pipe is a gas supply line pipe and said port is the inlet port of the gas meter.

17. A tamper indicating cover for a nut comprising:

a. a pair of "C" shaped unitary structure plastic cavity sections sized to fit around said nut, one on each side thereof, b. a first clip snap-locked into one end of each cavity section for locking one end of one cavity section to one end of the other cavity section, and c. a second clip snap-locked into the other end of each cavity section for locking the other end of one cavity section to the other end of the other cavity section.

* * * * *